US011995022B2

(12) United States Patent
Kabiry et al.

(10) Patent No.: US 11,995,022 B2
(45) Date of Patent: May 28, 2024

(54) TRANSMITTING DISPLAYPORT 2.0 INFORMATION USING USB4

(71) Applicant: Intel Corporation, Santa Clara, CA (US)

(72) Inventors: Ziv Kabiry, Kfar-Saba (IL); Reuven Rozic, Binyamina (IL); Gal Yedidia, Bitzaron (IL)

(73) Assignee: Intel Corporation, Santa Clara, CA (US)

( * ) Notice: Subject to any disclaimer, the term of this patent is extended or adjusted under 35 U.S.C. 154(b) by 808 days.

(21) Appl. No.: 16/859,996

(22) Filed: Apr. 27, 2020

(65) Prior Publication Data
US 2020/0257649 A1 Aug. 13, 2020

(51) Int. Cl.
*G06F 13/42* (2006.01)
*G06F 13/40* (2006.01)

(52) U.S. Cl.
CPC ...... *G06F 13/4282* (2013.01); *G06F 13/4068* (2013.01); *G06F 2213/0042* (2013.01)

(58) Field of Classification Search
CPC .................................................. G06F 13/387
See application file for complete search history.

(56) References Cited

U.S. PATENT DOCUMENTS

| 7,616,662 | B2 | 11/2009 | Mishra et al. |
| 8,898,366 | B2 | 11/2014 | Goodart et al. |
| 9,323,698 | B2 | 4/2016 | Park et al. |
| 9,729,431 | B1* | 8/2017 | Orr .......................... H04L 69/22 |
| 11,513,808 | B2* | 11/2022 | Raghav ................. G06F 9/4406 |
| 2018/0137833 | A1* | 5/2018 | Hundal .................. G09G 5/006 |
| 2019/0042521 | A1 | 2/2019 | Chen et al. |

\* cited by examiner

*Primary Examiner* — Henry Tsai
*Assistant Examiner* — Juanito C Borromeo
(74) *Attorney, Agent, or Firm* — Alliance IP, LLC

(57) ABSTRACT

A universal serial bus (USB) router can include a display port input device to receive a display port signal. The display port input device can include display port link layer parser circuitry to identify display port control or data information from the received display port signal, USB packet construction circuitry to construct a USB packet comprising the display port control or data information identified by the display port link layer parser circuitry, and a USB switch to transmit the USB packet comprising the display control or data information over a USB link. A display port output device can include display port packetizer circuitry to construct a display port packet from the display port control or data information from the USB packet, and display port output circuitry to output the display port packet across a display port link.

27 Claims, 10 Drawing Sheets

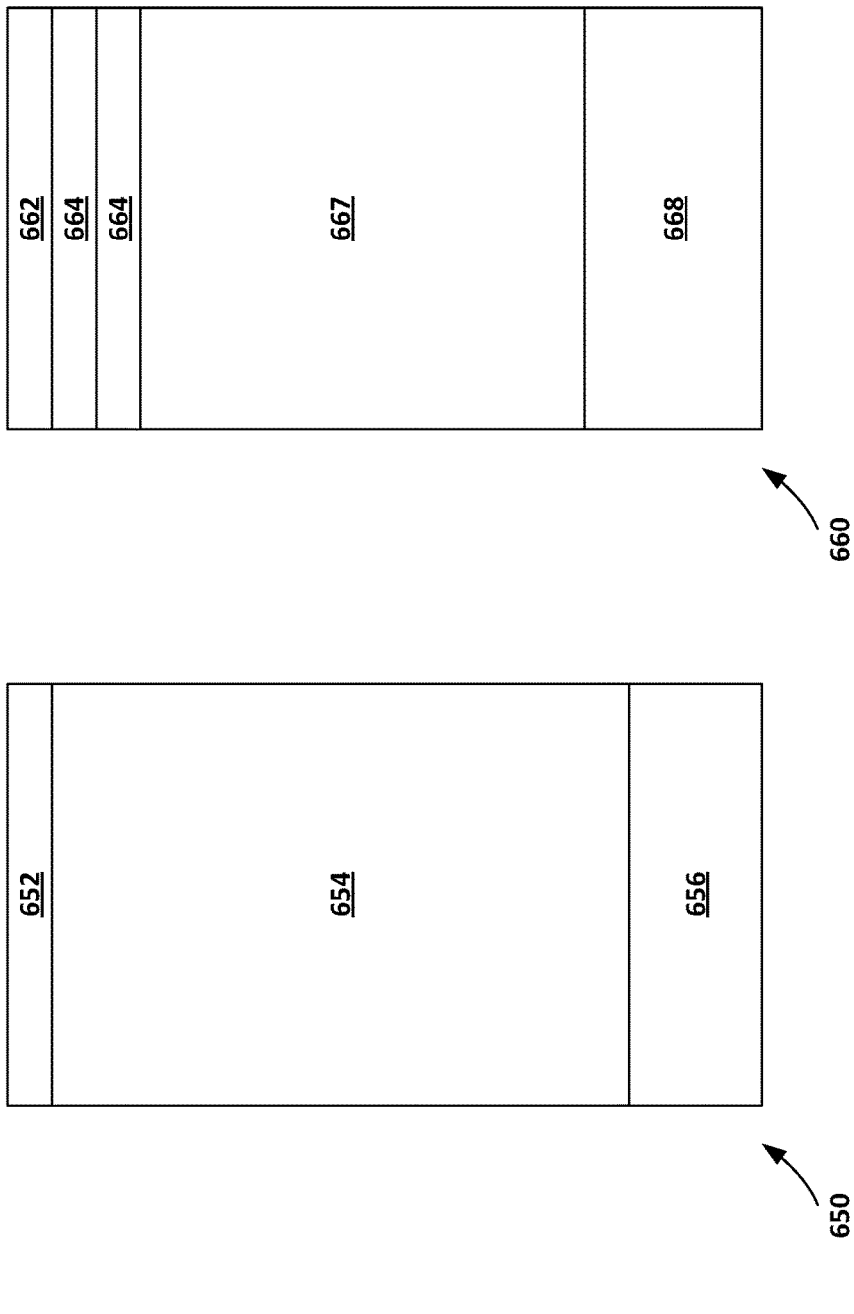

TRANSMITTING DISPLAYPORT 2.0 INFORMATION USING USB4

BACKGROUND

DisplayPort (DP) is a digital display interface to connect an image, a video, and/or another multimedia source to a display device, such as a computer monitor. Universal Serial Bus (USB) is a communications and interconnect protocol. USB protocols are germane to cables and connectors, as well as for protocols for communication and power delivery between computers, peripheral devices, and other components.

BRIEF DESCRIPTION OF THE DRAWINGS

FIG. 6B is a schematic diagram of example data-only USB packets that include display port payload in accordance with embodiments of the present disclosure.

Figures are not drawn to scale.

DETAILED DESCRIPTION

Figure 1:
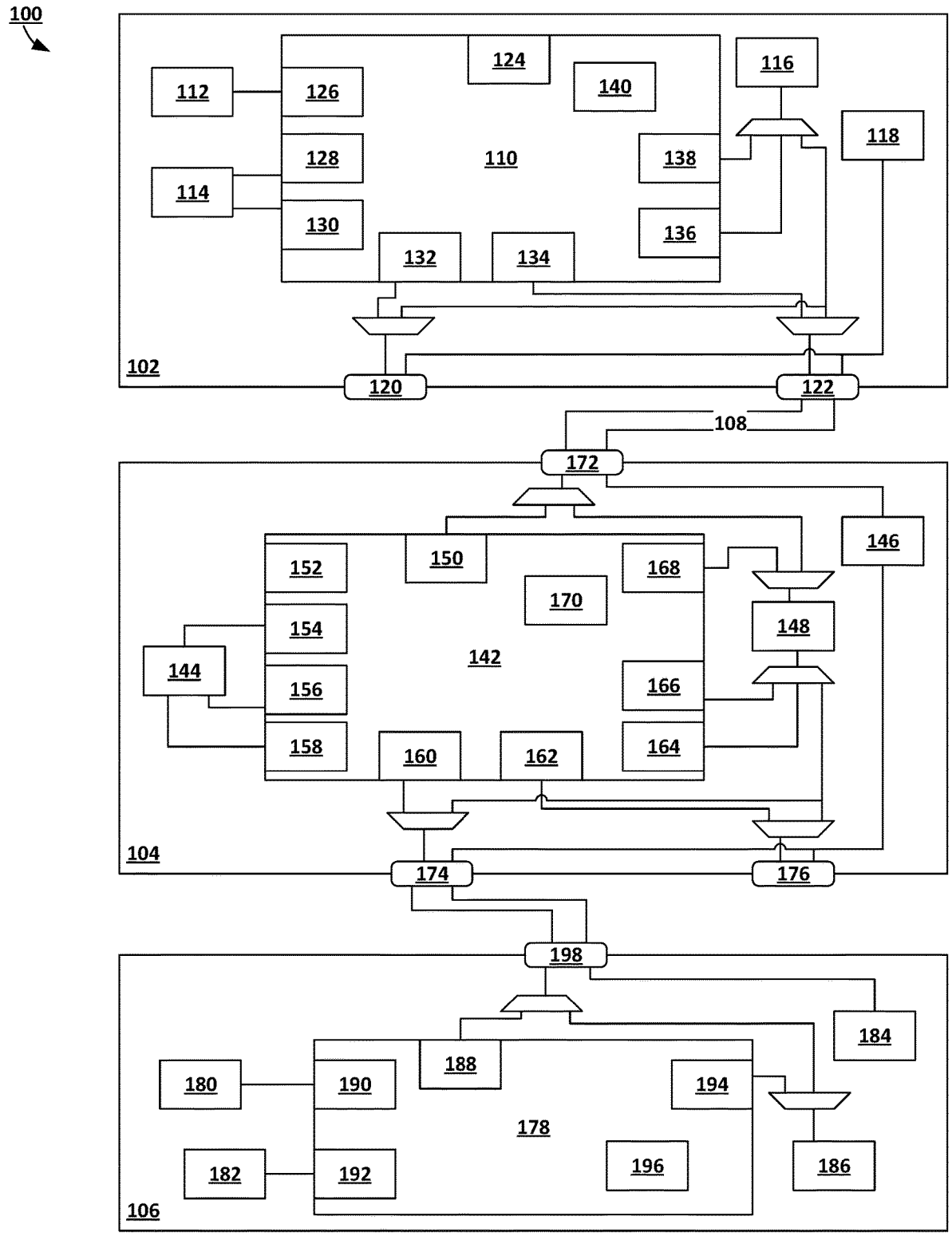
FIG. 1 is a schematic diagram of an example universal serial bus system in accordance with embodiments of the present disclosure.

FIG. 1 is a schematic diagram of an example universal serial bus (USB) system 100 in accordance with embodiments of the present disclosure. FIG. 1 illustrates the dual bus architecture of an example USB system 100, such as those implemented by USB4 or higher protocols. As architected, backward compatibility is supported with minimum interoperability starting at USB 2.0, working up through USB 3.2, and finally up to USB4 based on the highest common bus level supported across the interconnected components.

The USB system 100 can include a USB4 host 102 connected to a USB4 hub 104 by a USB link. The USB hub 104 can be connected to a USB device 106 by a USB link. The USB4 hub 104 can also be connected to other types of devices, such as displays or peripherals or other types of devices. The USB4 host 102 can be (or can be coupled to) a host device, such as a host device, computer, server, motherboard, processor or processor bank, or other type of host device. The USB4 hub 104 can be (or can include) a dongle, docking station, or other intermediate device. The USB4 device 106 can be an endpoint device, peripheral device, memory, or other type of device that connects to the USB4 host 102 and/or USB4 hub 104.

The system 100 can include a USB4 host 102. The USB4 host can include a host router 110, an internal host controller, and DisplayPort source 112, such as a DisplayPort2.0 source. The DisplayPort2.0 (or DP2.0 or DP 128b_132b) source can be a graphics processor and can include a DisplayPort transmitter (DPTX) that supports DP2.0. The DPTX can be compliant with a Video Electronics Standards Association (VESA) DisplayPort 2.0 protocol standard or future DisplayPort protocol standards versions.

A USB4 host supports 20G USB4 operation (Gen2x2) and optionally 40G USB4 operation (Gen3x2). A USB4 host can to support DisplayPort Alt Mode on all of its DFP.

A USB4 host can also optionally contain a PCIe controller 114. PCIe controller 114 can include (or be connected to) a PCIe root complex or PCIe switch complex for controlling PCIe-based routing to one or more peripheral devices. The PCIe controller 114 can be connected to the USB4 host router 110 through one or more PCIe adapters (e.g., PCIe downstream facing adapters 128, 130). The USB4 hub 104 can include (or be connected to) a PCIe switch 144 via PCIe upstream facing adapter 154 and PCIe downstream facing adapters 156 and 158. The USB4 device 106 can include a PCIe function 180 that is the PCIe downstream connected component or endpoint device that communicates with the PCIe controller 114 across the USB4 fabric 100. The USB4 device router 178 can include a PCIe upstream facing adapter 190 to couple the PCIe function 180 with upstream connected components, such as the USB4 hub 104, PCIe switch 144, and PCIe controller 114.

The USB4 host 104 can include a USB host router 110. The USB4 hub 106 can include a USB hub router 142. The USB4 device 106 can include a USB device router 178. A router is a fundamental building block of the USB4 architecture. A router maps Tunneled Protocol traffic to USB4 packets and routes packets through the USB4 fabric 100. A router also distributes and synchronizes time throughout the USB4 Fabric via its Time Management Unit (TMU), such as TMU 140, 170, and 196. A router is discovered and configured by a connection manager (e.g., a host interface adapter) 124 located within the USB4 host. The router includes a flat point-to-point, configurable switch necessary to create the internal paths between adapters. One router typically exists within each instance of a USB4 host 102, USB4 hub 104, or USB4 device 106. There are two types of Routers: Host Routers and Device Routers.

USB4 host or USB4 peripheral device can optionally support interoperability with Thunderbolt 3 (TBT3) products. A USB4 hub is required to support interoperability with Thunderbolt 3 products on all of its DFP. A USB4-Based Dock is required to support interoperability with Thunderbolt 3 products on its UFP in addition to all of its DFP.

When interoperating with a TBT3 product, Thunderbolt Alt Mode is established on the link between products. The USB Type-C Specification describes how a USB4 product negotiates and enters Thunderbolt Alt Mode.

The USB4 host 102 can include (or can be connected to) a display port (DP) source 112, such as a graphics processing unit (GPU) or other source of graphics, video, images, etc.

The USB4 host router 110 can include a DP_IN adapter 126 that can connect to the DP source 112. In embodiments, the DP source can be a USB4 peripheral device or can be connected to the USB4 host router 110 via a DisplayPort-based interconnect (e.g., via a DisplayPort 2.0 protocol interconnect).

The USB4 hub 104 can include a DP_OUT adapter 152 for outputting DP signaling to a DP sink, such as a display or monitor. The USB4 hub 104 can also transmit DP signaling via a USB4 tunnel to the USB4 device 106. The USB4 device 106 can include a DP_OUT adapter 192 for outputting DP signals to a DP sink 182, which can be a display or monitor.

The internal Enhanced SuperSpeed host 116 exposes one or more Downstream USB3 ports, which can be connected to a USB Endpoint or Downstream USB3 Protocol Adapter. The upstream port of the internal Enhanced SuperSpeed Hub interfaces with an Upstream USB3 Protocol Adapter that forwards packets to the Upstream Facing Port of the USB4 hub.

Each router contains up to 64 adapters. Adapters provide an interface between a router and an external entity. There are three types of Adapters: Protocol Adapters, Lane Adapters, and Control Adapters. A Protocol Adapter is used to translate between a supported native protocol and a USB4 tunnel. There are four types of Protocol Adapters: USB3 Adapters 136, 138, 164, 166, 168, and 194, DisplayPort (DP) Adapters 126, 152, and 182, PCIe Adapters 128, 130, 154, 156, 158, and 190, and Host Interface Adapters 124.

A router can support an internal Control Adapter that is used solely for transmitting and receiving Control packets to and from the Transport Layer. Unlike the non-Control Adapters, the Control Adapter does not connect directly to a Link and thus does not have a Physical Layer associated with it.

A USB4 Port is the entity that provides the USB4 functional interface that resides on each end of a USB4 Link. It consists of the transmit and receive Lanes of the USB4 data bus along with a two-wire Sideband (SB) Channel (SBTX/SBRX). USB4 Ports operate as either a Single-Lane Link or Dual-Lane Link. When operating as a Single-Lane Link, Lane 1 of the USB4 Port is disabled. When operating as a Dual-Lane Link, Lanes 0 and 1 are logically bonded together to provide a single data channel. Example US4 ports are shown as elements 132, 134, 160, 162, and 188.

The primary communication channel of the USB4 Fabric is over the USB4 Link that interconnects two USB4 Ports. The USB4 Link transports packets for both Tunneled Protocol traffic and bus management traffic between Routers. The Sideband Channel of a USB4 Port is used to initialize and manage the USB4 Link between the USB4 Ports. For a USB4-enabled USB Type-C port, the complete interface includes a USB4 Port, a USB 2.0 data bus, and the USB Type-C Configuration Channel (CC) along with power/ground (VBUS, VCONN and GND).

At a high level, a USB4 hub 104 is functionally similar to a USB 3.2 hub—it consists of one Upstream Facing Port and one or more Downstream Facing Ports. USB4 hub 104 functionally operates as a tree-like structure for enabling one or more Downstream Facing Ports to be served by one Upstream Facing Port, typically for the purpose of port expansion.

In addition to the USB4-specific hub functionality, USB 3.2 and USB 2.0 hub functionality is supported such that Downstream Facing Ports of a USB4 hub can support backward-compatibility with USB 3.2 and USB 2.0 devices. USB 2.0 functionality can be provided via USB 2.0 host 118 connected to a USB 2.0 hub 146 and USB 2.0 function 184.

A USB4 hub contains a Device Router, an Enhanced SuperSpeed USB hub, a PCIe switch, and a USB 2.0 hub. A USB4 hub supports 20G USB4 operation (Gen2x2) and 40G USB4 operation (Gen3x2). A USB4 hub is required to support DisplayPort Alt Mode on all of its DFP. See the USB Type-C Specification for a full definition of the requirements and details regarding DisplayPort Alt Mode support on a DFP.

The USB4 host 102, hub 104, and device 106 can include one or more USB Type-C connector ports 120, 122, 172, 174, 176, and 198. The USB Type-C connector ports can receive USB Type-C connectors for connected USB compliant components and for transferring information and power between components.

Figure 2A:
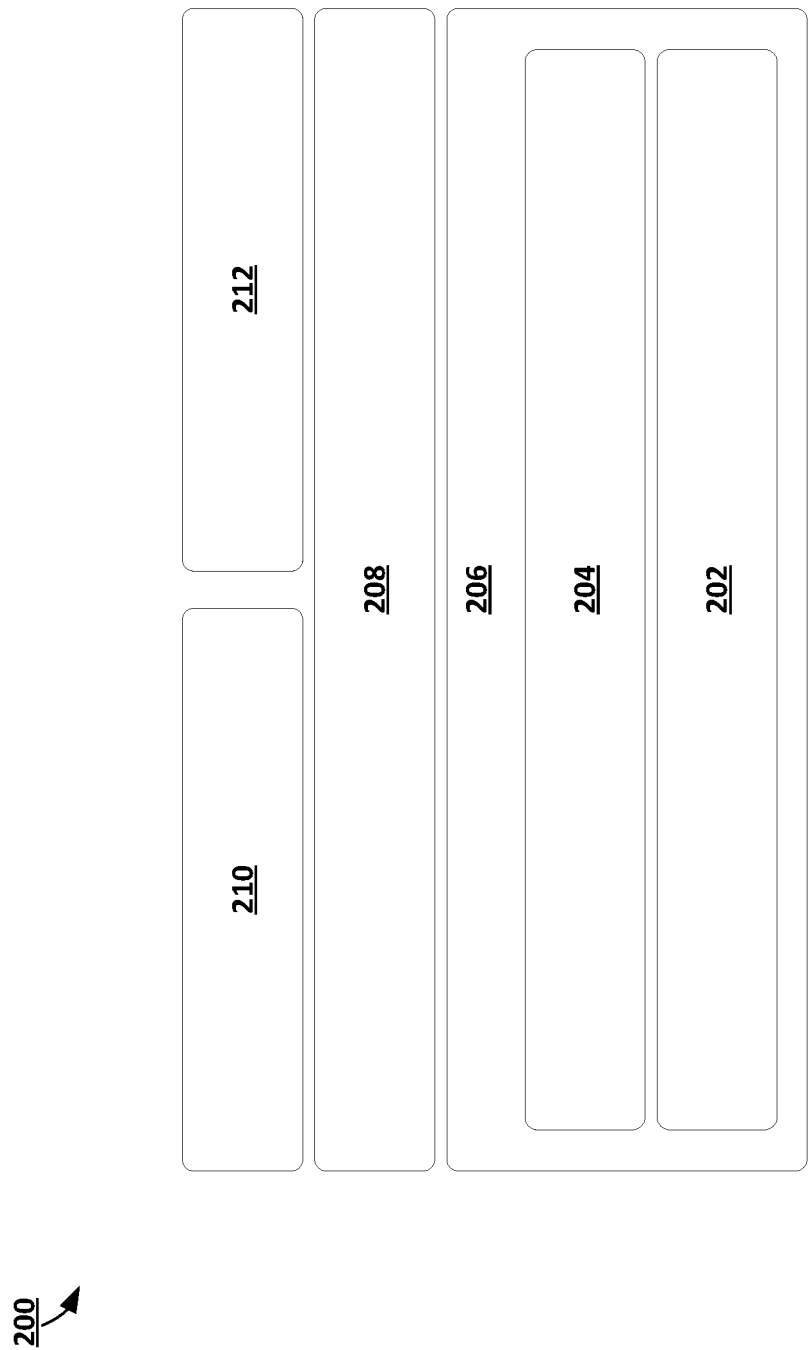
FIG. 2A is a schematic diagram of an example universal serial bus protocol stack in accordance with embodiments of the present disclosure.

FIG. 2A is a schematic diagram of an example USB protocol stack 200 in accordance with embodiments of the present disclosure. The USB4 protocol stack 200 can include an electrical layer 202 and a logical layer 204. The electrical layer 202 and logical layer 204 can be considered sub-blocks of the physical layer 206. The electrical layer 202 defines electrical signaling characteristics of a USB4 Link including scrambling, encoding, jitter, and voltage. The logical layer 206 establishes a USB4 link between two routers and provides services to transmit and receive streams of bytes between them. The logical layer 204 resides on top of the electrical layer 202 and below the transport layer 208. The logical layer 204 treats the traffic to and from the transport layer 208 as a byte stream.

The services provided by the logical layer 204 are establishment and maintenance of a USB4 Link with a Link Partner, performance scalability via different speeds and widths, error detection and recovery mechanisms, operation with different media such as passive cable, active cable, and re-timers, support for mechanisms such as clocking compensation, data scrambling, and Forward-error-correcting codes, and power management.

A USB4 Link is assisted and managed by a companion Sideband Channel that configures parameters of the USB4 Link, interacts with Re-timers (if present) and performs USB4 Link TxFFE handshake, ensures a correct power down/wake up sequence of the USB4 Link transceivers and Retimers.

The transport layer 208 forwards tunneled packets and control packets through the bus. The transport layer 208 defines packet format, routing, Quality-of-Service (QoS) support, flow control, and time synchronization. The transport layer 208 is where protocol MUXing is performed.

The configuration layer 204 performs router configuration tasks and handles incoming control packets. The configuration layer 204 provides an addressing scheme for control packets within the domain, processes control packets, and delivers a reliable transport mechanism for control packets. Control packets provide the connection manager with access to the configuration spaces of a router.

The protocol adapter layer 204 performs mapping between Tunneled Protocol traffic and USB4 Transport layer packets. A protocol adapter layer 204 is defined by the type of tunneled protocol traffic it sends and receives.

A USB4 host supports USB3 Tunneling, DisplayPort Tunneling, and Host-to-Host Tunneling. A USB4 host can also optionally support PCIe Tunneling. A USB4 hub supports USB3 Tunneling, DisplayPort Tunneling, PCIe Tunneling, and Host-to-Host Tunneling. There are multiple ways that a USB4 hub supports DisplayPort Tunneling. For example, the USB4 hub acts as a "pass through" for DisplayPort Tunneling (i.e. the USB4 hub routes tunneled traffic directly between two of its USB4 Ports). The USB4 hub contains a DP OUT Adapter that receives Tunneled DisplayPort traffic from a USB4 Port and sends it to a DisplayPort Sink.

Figure 2B:
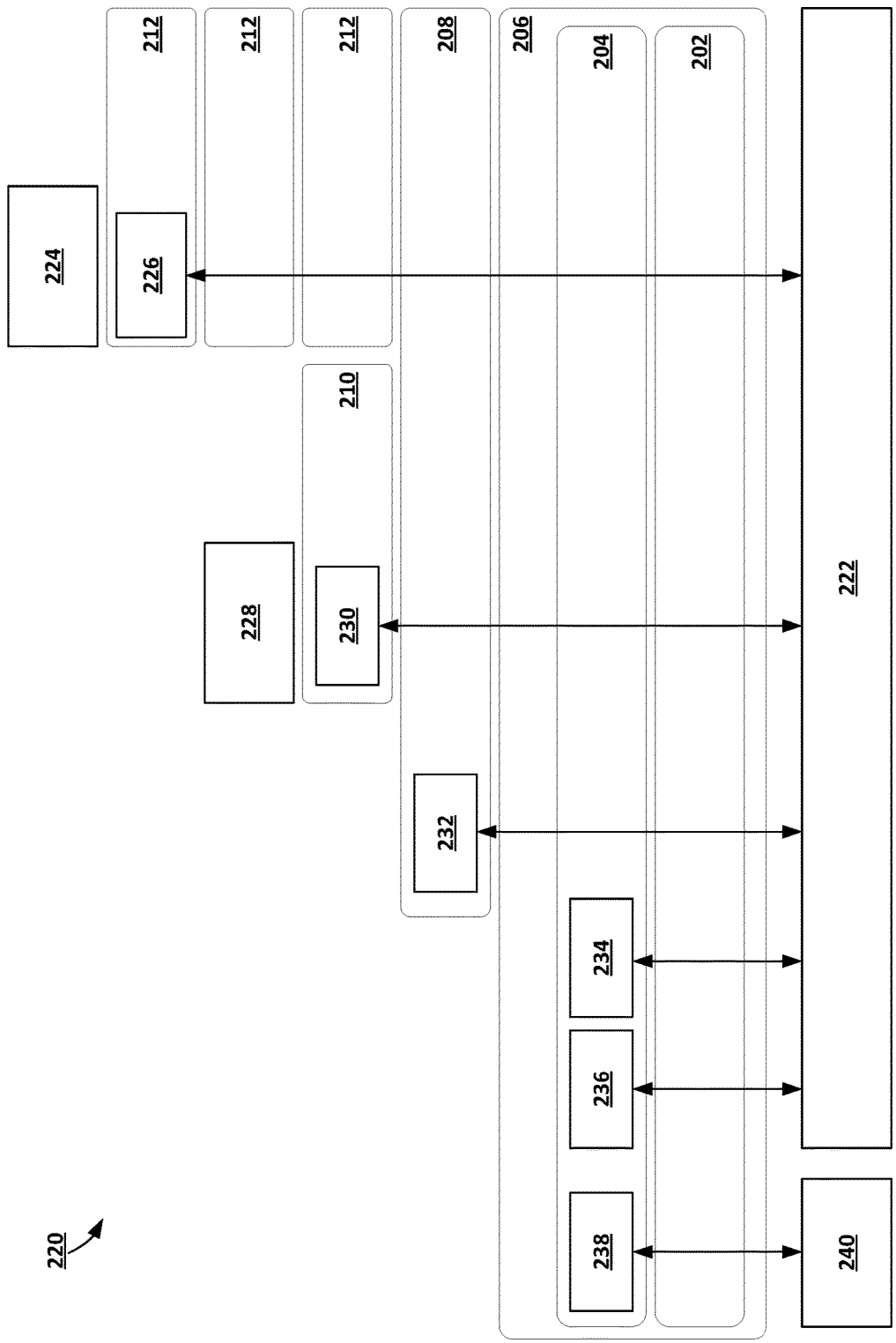
FIG. 2B is a schematic diagram illustrating example universal serial bus functional layer communication pathways in accordance with embodiments of the present disclosure.

FIG. 2B is a schematic diagram 220 illustrating example universal serial bus functional layer communication pathways in accordance with embodiments of the present disclosure. The communication construct can include a USB4 link 222 that communicates packets and ordered sets.

Control packets 226 are used by a connection manager 224 to configure and manage the routers across the bus. Control packets 226 are also used by a router to communicate with the connection manager 224. Control packets 226 are routed over the bus based on a route string that identifies a router's position in a spanning tree. When a control packet 226 originates from the connection manager 224, the route string identifies the router that the packet is targeted to. When a control packet 226 originates from a router, the router string identifies the router that sent the packet. A control adapter in a non-target Router forwards the packet to a USB4 Port. The control adapter of the target router consumes the control packet 226.

Protocol traffic 228 is encapsulated and tunneled over the USB4 fabric in tunneled packets 230. Tunneled packets 230 traverse the USB4 fabric along one or more paths.

Link management packets 232 are confined to a single USB4 Link 222. Link management packets 232 originate in the transport layer 208 of a router at one end of the link and terminate in the transport layer of the router at the other end of the link. The following link management packets are defined: Time Sync packets—Used to synchronize the clocks of the Routers on the bus; Flow Control packets—Used to prevent buffer overflow; Idle packets—Ensure a steady byte stream is fed to the Logical Layer when no other Transport Layer packets are being transmitted.

Transport layer packets are either tunneled packets from protocol adapter layers, control packets from the configuration layer, or generated within transport layer (namely, link management packets generated within the transport layer).

Tunneled packets are generated by the protocol adapter layer of a source adapter and handed off to the transport layer. A tunneled packet shall have the header defined for transport layer packets in Table 1. The protocol adapter layer of a source adapter shall fragment protocol traffic larger than 256 bytes into multiple tunneled packets. Reassembly of protocol traffic from tunneled packets shall be performed by the protocol adapter layer of the destination adapter.

The size of a transport layer packet is always a multiple of 4 bytes. The protocol adapter layer of a source adapter shall add between 0 and 3 bytes of padding to the payload of a tunneled packet to ensure that the tunneled packet is of a size that is a multiple of 4 bytes. The protocol adapter layer of the destination adapter shall remove any bytes of padding.

The content of the padding bytes is implementation-specific and cannot be assumed to have any specific values. However, it is recommended that zero-byte padding be used.

Figure 3:
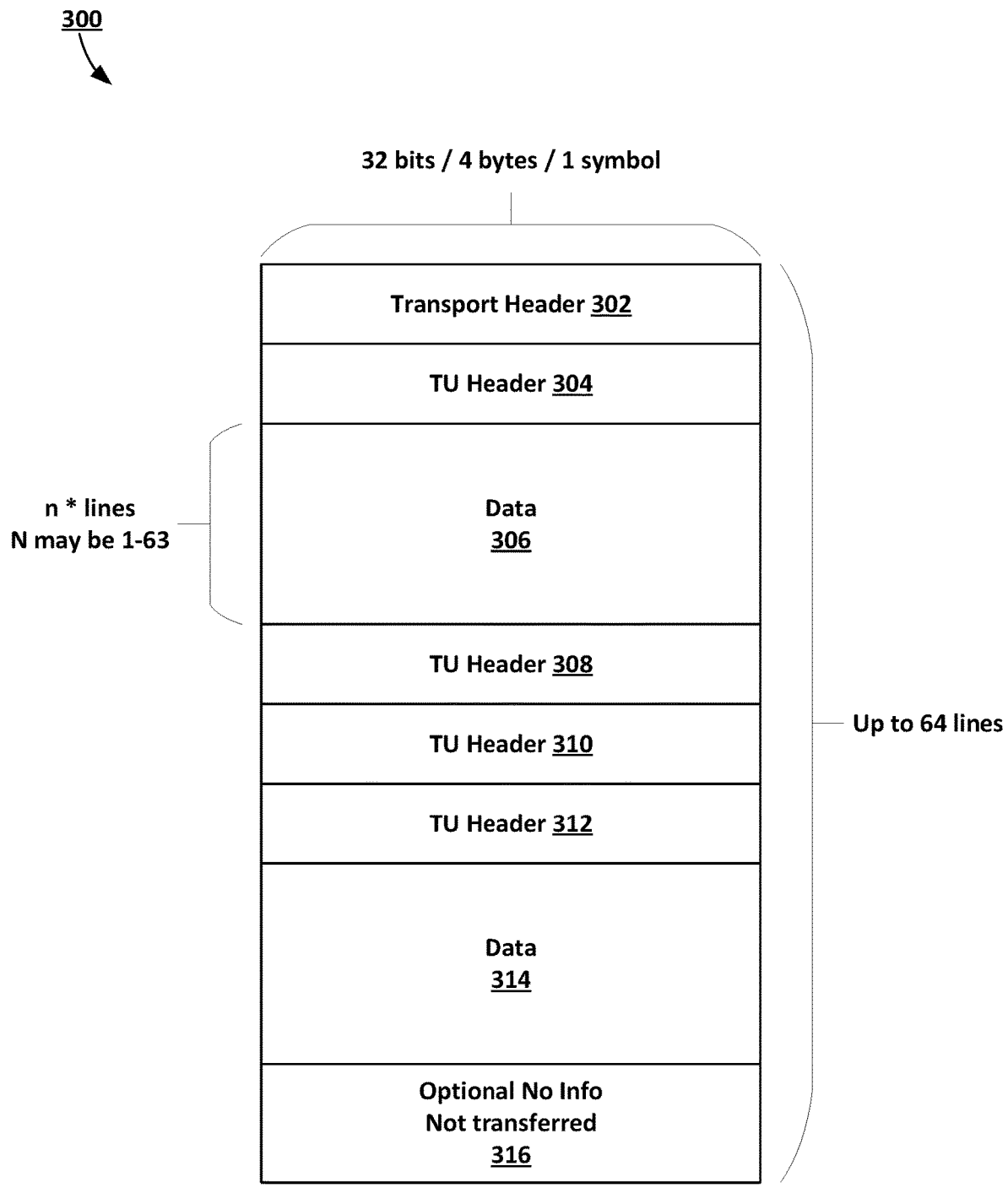
FIG. 3 is a schematic diagram of an example universal serial bus packet in accordance with embodiments of the present disclosure.

FIG. 3 is a schematic diagram of an example USB packet in accordance with embodiments of the present disclosure. In USB4, each packet size can include 256 bytes inclusive of headers. There are two type of headers: Transport Layer Header format, which includes a Protocol Defined Field (PDF) and Length—contain the payload size in bytes excluding the padding size. A second type of header is a Transfer Unit header defined per a specific PDF format. The example packet 300 is shown to include a transport layer header 302, as well as several transfer unit headers 304, 308, 310, and 312.

Table 1 illustrates an example transport layer packet header format.

TABLE 1

Transport Layer Header Format.

| Bits | Field | Description |
| --- | --- | --- |
| 7:0 | HEC | Header Error Control |
| 15:8 | Length | Length - shall contain the payload size in bytes excluding the padding size. A value of 00h is used to indicate a payload size of 256 bytes (all data) |
| 26:16 | HopID | HopID - Uniquely identifies a path in the context of a link. |
| 27 | SuppID | Supplemental ID - Used to distinguish certain types of link management packets that need additional distinction. Set to 0b in a tunneled packet. |
| 31:28 | PDF | Protocol Defined Field - contents depend on packet type. Tunneled packets: defined by the protocol adapter layer. Link management and control packets: together with the SuppID and HopID fields, identifies the link management or control packet type. |

The logical layer 204 uses ordered sets 234 for tasks such as symbol synchronization, link training, and de-skew between lanes. Ordered sets 238 are 66-bit symbols (at Gen 2 speed) or 132-bit symbols (at Gen 3 speed).

The sideband channel 240 handles the following events: Lane Initialization; Connection or disconnect on a USB4 port; Lane disable or enable; and Entry or exit from Sleep state.

Low frequency periodic signaling (LFPS) 236 is used for in-band communication between two Link Partners when exiting power management link states.

The packet 300 can also include data fields 306 and 314. The length of the data fields can be defined by the transport layer header 302.

The video and audio data carried over a DisplayPort SST Main-Link is organized into frames. Each frame contains several active scan lines followed by a vertical blanking period. Each scan line contains active pixel data followed by a horizontal blanking period. The active pixel data is organized into fixed-size chunks called Transfer Units. Each Transfer Unit (TU) contains active pixel data followed by Stuffing Symbols. Stuffing Symbols are also sent during the horizontal and vertical blanking periods.

When a DisplayPort SST Main-Link is mapped onto USB4, the continuous main-link data stream is encapsulated into tunneled packets. Before encapsulation, all the DP dummy or stuffing symbols (within a TU and during the blanking periods) are discarded by the DP_IN Adapter. Stuffing Symbols are recreated by the DP OUT Adapter when the Main-Link data stream is extracted from the tunneled packets. In order to enable accurate reconstruction of the Stuffing Symbols at the DP OUT Adapter, the DP IN Adapter includes a fill count field in each tunneled packet. The fill count field specifies the number of Stuffing Symbols that were discarded immediately preceding the packet.

Figure 4:
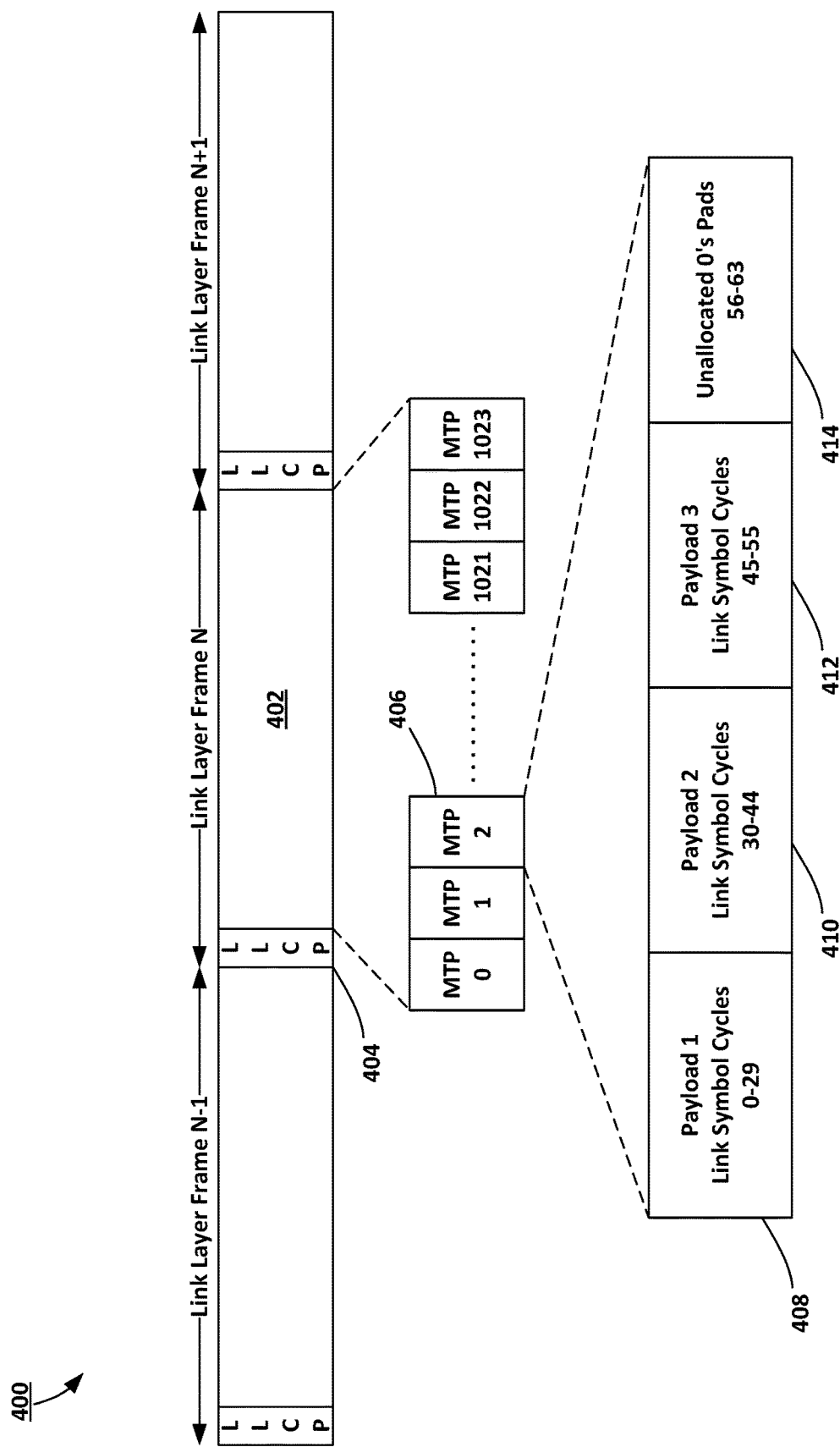
FIG. 4 is a schematic diagram of an example display port signal in accordance with embodiments of the present disclosure.

FIG. 4 is a schematic diagram of an example display port signal 400 in accordance with embodiments of the present disclosure. A display port link layer operates as four main link lanes, each lane symbol data size is 32 bits, and each valid link layer clock carries a total of 128bits. DisplayPort 2.0 link layer frames can countian 1024 multi-stream transport packets (MTP). FIG. 4 illustrates an example DP2.0 link layer MTP and link layer frames.

An example link layer frame N 402 can include 1024 MTPs, such as MTP 2 406. Based on DisplayPort specification each stream includes useful data, control information and staffing symbols. Every 64 link symbols (or valid clocks cycles) are named slots: each Multi Stream Transport Packet (MTP) includes 64 slots. The DisplayPort specification allows for the transfer of up to 64 separate streams over a link, one stream per each slot, or combine multiple slots for single stream. FIG. 4 shows an example of three streams, where each stream uses a different number of slots: (Payload 1 408 uses slots 0-29, Payload 2 410 uses slots 30-44, and Payload 3 412 uses slots 45-55). In addition, slots 56-63 414 are unallocated and are populated with pads, having a value of 0. Un-used slots are un-allocated and are padded by 0x00 data.

Each frame 402 of 1024 MTPs is starts with a link layer control packet (LLCP) 404, which includes four data bytes of information.

This disclosure describes tunneling of DisplayPort 2.0 information using USB4 transport. Logically, the two endpoints of the tunnel are DisplayPort links DPTX and DPRX, as defined by VESA. Over the tunnel itself, control and data are transported, while idles, padding, or filling information used by DisplayPort is stripped from the tunnel.

Figure 5:
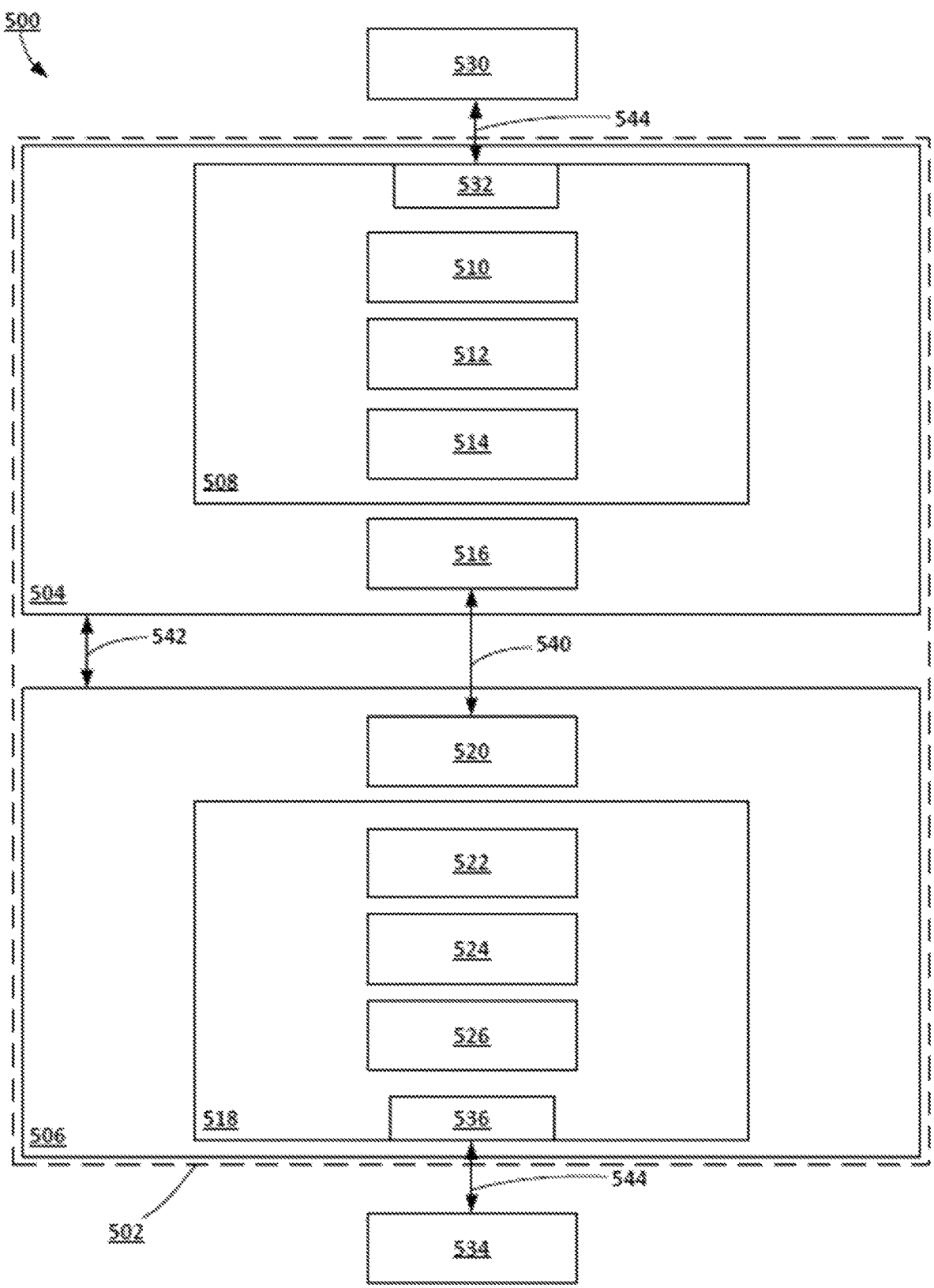
FIG. 5 is a schematic diagram of an example universal serial bus hub in accordance with embodiments of the present disclosure.

FIG. 5 is a schematic diagram of an example USB hub 500 in accordance with embodiments of the present disclosure. USB hub 500 can include a single unit 502 that encases the various hardware circuit elements and/or software elements described below. In some embodiments, the USB hub 500 can be separated into two routers 504 and 506 connected together by a USB4 link 540. Routers 504 and 506 can be separate units or can be encapsulated into a single unit 502.

USB4 router 504 can include a USB4 DisplayPort Input (DP_IN) module 508. USB4 DP_IN module 508 can include various hardware circuit elements and/or software elements for receiving a display port signal and mapping display port signal information from the display port signal into a USB4-compliant packet.

The USB router 506 can include a USB4 DisplayPort Output (DP_OUT) module 518. DP_OUT module 518 can include various hardware circuit elements and/or software elements for receiving a USB4 packet and outputting a display port compliant signal to a display port sink 534 across a display port connection. The display port sink 534 can be monitor, display, or other consumer of the display port signal.

The USB4 DP_IN module 508 can include display port interface 532 that can be coupled to a display port signal source 530 by a display port link 544. The display port signal source 530 can be a graphics processor or other media source.

The USB4 DP_IN module 508 can include a DP2.0 PHY Logical Sublayer Remover element 510. The DP2.0 PHY Logical Sublayer Remover 510 (or simply the remover element 510) can be considered the entry circuitry to the USB4 DP_IN module 508. DisplayPort PHY logical sub-layer defines the data encoding using a 128/132 style. In addition to the encoding, the DP PHY logical sub-layer uses pre-defined overhead for data scramble, stream synchronizing, error correction, and padding. The remover element 510 is responsible to remove the encoding and overhead information from a received display port signal after handling operations, such as keeping alignment or correcting errors as defined by the DisplayPort specification.

The DP_IN module 508 also includes a DP2 Link Layer Parser module 512 (or simply, parser module 512) implemented in hardware circuitry, software, or a combination of hardware circuitry and software. The parser module 512 can identify allocated slots from the DP signal and extract payload information from the allocated slots. The payload information can include data and/or control information. The parser module 512 can ignore the un-allocated slots from the incoming display port signal.

A USB4 packetizer module 514, implemented in hardware circuitry, software, or a combination of hardware circuitry and software, can create USB4-compliant packets using the payload information from the display port signal identified by the parser module 512. Three types of packets can be created, depending on the payload information in the display port signal: an LLCP Packet, a Data+Control Packet, or a Data Only Packet.

Figure 6A:
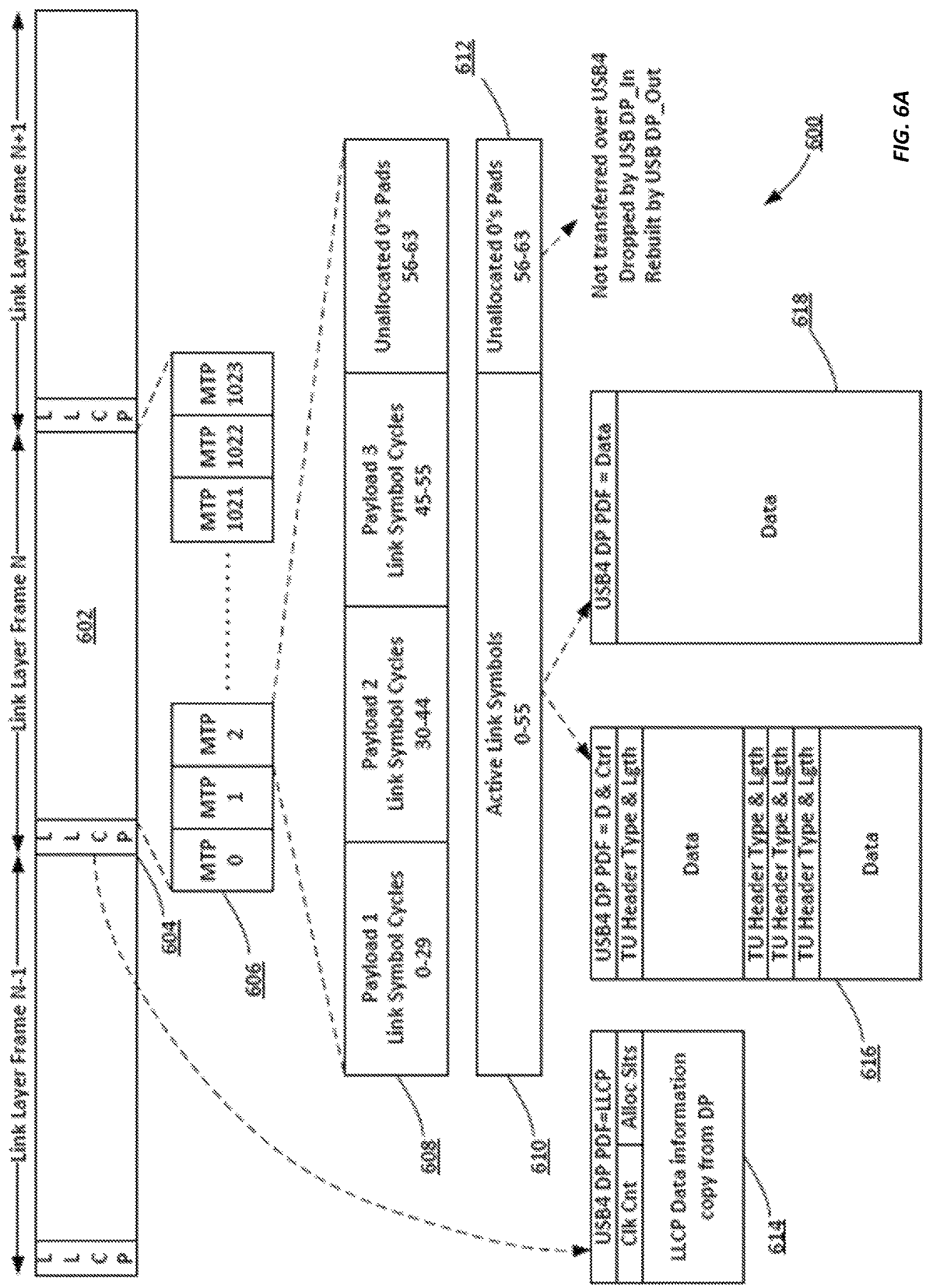
FIG. 6A is a schematic diagram of example mappings between a display port signal and a universal serial bus packet in accordance with embodiments of the present disclosure.

FIG. 6A is a schematic diagram of example mappings 600 between a display port signal and a USB packet in accordance with embodiments of the present disclosure. The example mapping 600 illustrates how information from a display port signal (e.g., a link layer frame) can be mapped to a USB4-compliant packet.

As mentioned above, the link layer frame 602 can include an LLCP 604 and 64 slots per each MTP 606. The LLCP from the display port signal can be used to create a USB4-compliant packet exclusively for the LLCP payload (USB4 DP LLCP packet 614). The LLCP packet 614 includes the LLCP information received by USB4 DP_IN module from DPTX. The LLCP packet includes the LLCP DisplayPort information as 96 bits and can transport the LLCP over the tunnel. Table 2: DisplayPort 2.0 LLCP packet over USB4.

TABLE 2

| | USB4 DP LLCP Packet | | |
|---|---|---|---|
| USB Header | PDF = 8 HopID | Length | HEC |
| USB4 Info | Idle Count [16:0] | Allocated slots [6:0] | Reserved [7:0] |
| DisplayPort 2.0 Info | ECF [15:0] | Reserved [13:0] ECF [47:16] | ENC ACT |
| | LVP [15:0] | | ECF[64:48] |

Among the pertinent information in the LLCP is the allocated slots field indicating the allocated slots in the forthcoming display port signal frame. The tunnel itself can use the Allocation Change Trigger (ACT) bits to trigger new allocation of the slots. Whenever the ACT bits are active, DisplyPort 2.0 link logical Parser 512 can transfer in the USB4 LLCP packet an update on allocated slots to USB4 DP_Out.

The link layer frame 602 can include control and/or data information (referred to as payload). Different payloads can be carried by each collection of allocated slots, such as Payload 1 in slots 0-29 (608), Payload 2 in slots 30-44, and Payload 3 in slots 45-55. Slots 56-63 can be unallocated slots, which include Os as pads. The parser element 512 can consider the allocated slots 0-55 as active link symbols 610 and the unallocated slots as inactive link symbols 612.

In some cases, the link layer frame 602 can include data and control information. A Data & Control packet 616 can be created that includes both data and control information from the display port signal.

The USB4 Data+Control Packet 616 can include data and control information from the display port signal. Data or control includes filling information transferred using data and control packets. Control information is transferred over the DisplayPort 2.0 as 128 bits. Over the tunnel it is optimize into 32 bits for single symbol or repetitive continues same symbol. Table 3 illustrates an example DisplayPort 2.0 payload mapped to a USB4 packet.

Table 4 illustrates an example TU header structure in accordance with embodiments of the present disclosure.

TABLE 4

| TU Header Structure. TU Header | | | |
|---|---|---|---|
| 31 . . . 27 Coding Type | 26 . . . 25 Rvd | 24 . . . 16 Size No of DP Symbols | 15 . . . 0 Reserved |
| [4:0] | [17:16] | [8:0] | [15:0] |

In the example above, the display port signal input to the USB4 DP_IN module 508 includes four distinct control signals: Control 1, Control 2, Control 3, and Control 4. The type indicator indicates whether the line of USB payload includes data or control information. The display port signal repeats the Control 1 signal twice on each lane. The corresponding Control 1 signal is compressed to a single field of the USB4 signal, but a repetitive counter indicates that the Control 1 signal is to be repeated twice on each lane of the reconstructed display port signal. The Control 2 signal appears once on each lane, and the USB4 packet header includes a repetitive counter indicator of 1, indicating that the Control 2 signal is repeated once on each lane of the corresponding reconstructed display port signal. Such compression allows for all of the control information from the display port signal to be transported across the USB link using a USB4 packet.

The data signal from the display port signal is similarly compressed. The display port data is interleaved between the four lanes. The data type indicates the start of data within the

TABLE 3

| | USB4 Packet Mapping of DisplayPort 2.0 Payload Information | | | | | | |
|---|---|---|---|---|---|---|---|
| | DisplayPort 2.0 Information | | | | Tunnel | | |
| Slots | Lane 3 32 bits | Lane 2 32 bits | Lane 1 32 bits | Lane 0 32 bits | TU Header (see Table 4) | | Data (128 bits) |
| 1 | Control 1 | Control 1 | Control 1 | Control 1 | | | |
| 2 | Control 1 | Control 1 | Control 1 | Control 1 | Control 1 | 2 | NA |
| 3 | Control 2 | Control 2 | Control 2 | Control 2 | Control 2 | 1 | NA |
| 4 | Control 3 | Control 3 | Control 3 | Control 3 | | | |
| 5 | Control 3 | Control 3 | Control 3 | Control 3 | | | |
| 6 | Control 3 | Control 3 | Control 3 | Control 3 | Control 3 | 3 | NA |
| 7 | Data 1 | Data 2 | Data 3 | Data 4 | Data | 12 | Data 1-4 |
| 8 | Data 5 | Data 6 | Data 7 | Data 8 | | | Data 5-8 |
| 9 | Data 9 | Data 10 | Data 11 | Data 12 | | | Data 9-12 |
| 10 | Control 4 | Control 4 | Control 4 | Control 4 | Control 4 | 1 | NA |

USB4 packet. The repetitive counter indicator indicates the number of lines that the data is to occupy in the USB4 packet.

The transfer unit (TU) header can also include a bit mapping to for indicating how the display port control and data information can be read from the USB4 packet. Table 5 illustrates an example TU header.

TABLE 5

TU Header Bit Mapping

| Control Type | Coding | Description | Size |
|---|---|---|---|
| Data | 10000b | Data | Represents the number of following data in multiples of symbols (4 bytes/32 bits). Can be video, SDP, VBID data. |
| BE | 01000b | Blank End | Represents the number of repetitive BE start from current slot |
| BS | 00010b | Blank Start | Represents the number of repetitive BS start from current slot |
| SS | 00110b | Secondary Start | Represents the number of repetitive SS start from current slot |
| SE | 00101b | Secondary End | Represents the number of repetitive SE start from current slot |
| SF | 00111b | Symbol Filling | Represents the number of repetitive SF start from current slot |
| EOC | 00011b | End Of Chunk | Represents the number of repetitive EOC start from current slot |
| VCPF | 01001b | VC Payload Fill | Represents the number of repetitive VCPF start from current slot |
| AVF (Active video fill) | 01011b | Active Video fill (for PR) | Represents the number of repetitive AVF start from current slot on Ingress, Egress shall put 00 scramble data on these slots |

In some embodiments, a data-only packet can be created. For example, in cases where bandwidth is to be preserved over the USB4 link, the packetizer module 514 can create a data-only USB4 packet 618 that only contains the data payload from the display port signal.

FIG. 6B is a schematic diagram of example data-only USB packets 618 that include display port payload in accordance with embodiments of the present disclosure. The data only packet can be used increase the utilization between raw data and tunnel overheads. The data-only packet includes a PDF header to indicate the packet type (e.g., PDF=10). The rest of the packet can include data. The data-only packet can increase the utilization in that case from 96.875% (62/64) to 98.4% (63/64).

In FIG. 6B, examples of a first data-only packet 650 and a second data-only packet 660 are illustrated. The first data-only packet 650 can include a first line for a transport header that includes a PDF 652. PDF 652 can include a value of 10 to indicate a data-only packet. A first portion 654 of the data-only packet can include data from a first MTP. For example, the first portion 654 can include 15 slots×16 bytes from a first MTP taking up 240 bytes or 60 lines of the first data-only packet 650. A second portion 656 of the first data-only packet 650 can include 3 symbols out of 4 from a first slot (slot 0) of a second MTP, taking up 12 bytes or 3 lines.

The second data-only packet 660 can include a first line for a transport header that includes PDF 662, with a PDF=10. The second data-only packet 660 can include a first portion 664 that includes the last 1 symbol from the first slot (slot 0) of the second MTP, taking up 4 bytes or 1 line. The second data-only packet 660 can include a second portion 667 that includes 14 slots×16 bytes from the second MTP, taking up 236 bytes or 56 lines. The second data-only packet 660 can include a third portion 668 that includes 4 symbols from the first slot (slot 0) of a third MTP, taking up 16 bytes or 4 lines. More data-only packets can follow to cover the entirety of the DP payload from the DP link layer frames.

Returning to FIG. 5, once the USB4 packet is created that includes the display port information, the USB4 packet can be transmitted across a USB4-compliant link 540 by a USB4 switch 516 to be received by a USB4 switch 520 at a USB4 DP_OUT module 518.

In some embodiments, the USB4 DP_OUT module 518 can be part of the USB4 hub 508 or can be connected to the DP_IN module 508 via a USB4 link 540. The DP_OUT module 518 can include various hardware elements to receive the USB4 packet, identify the display port information within the USB4 packet, reconstruct a display port signal, and transmit the display port signal to a display port sink 534 across a display port link 544.

The DP_OUT module 518 can include a USB4 DP data buffer implemented in hardware circuitry or software or some combination of hardware circuitry and software. The data buffer 522 can receive the input USB4 packet and temporarily store the USB4 packet. A USB4 DP reconstructor module 524, implemented in hardware circuitry, software, or a combination of hardware circuitry and software, can reconstruct the display port signal from the display port payload in the USB4 packet. The DP reconstructor module 524 can use the USB4 packet header PDF to identify a display port signal type to begin reconstruction of the display port signal. Table 6 illustrates an example Display-Port 8b_10b/128b_132b Protocol Defined Fields in the USB4 header to define a packet type for construction of a USB4 packet.

TABLE 6

DisplayPort 1.4/2.0 PDF

PDF  Packet Type 1-7  used for legacy DP 1.4 transfer over USB4
    1.    DP 8b_10b SST Video data packet header
    2.    DP 8b_10b SST Blank start packet
    3.    DP 8b_10b SST MSA packet TABLE 6-continued DisplayPort 1.4/2.0 PDF PDF Packet Type

| | | |
|---|---|---|
| | 4. | DP 8b_10b SST SDP packet |
| | 5. | DP Clock Sync Packet |
| | 6. | DP 8b_10b MST packet |
| | 7. | DP 8b_10b FEC_DECODE packet |
| 8 | used for DP 128b_132b LLCP packet | |
| 9 | used for DP 128b_132b Data + Control packet | |
| 10 | used for DP 128b_132b Data-only packet | |

Depending on the packet type, the DP re-constructor 524 can determine whether the display port signal is to be an LLCP, control+data, or data only display port signal. The DP re-constructor module 524 can then create a link layer frame using the payload from the USB4 packet. The re-constructor module 524 can extract the payload from the received USB4 packet and map the payload into a DP link layer frame.

A DP builder module 526, implemented in hardware circuitry, software, or a combination of hardware circuitry and software, can add overhead and encoding information back into the display port signal. The recovery of the encoding and overhead information that was removed by DP_In remover element 510 is reproduced by the DP builder module 526 located in the USB4 DP_Out module. The resulting display port signal would then mirror the incoming display port signal, including padding for unallocated slots of each MTP. Such overhead information can be transferred from the DP_IN module 508 to the DP_OUT module 518 via a sideband channel 542.

Figure 7:
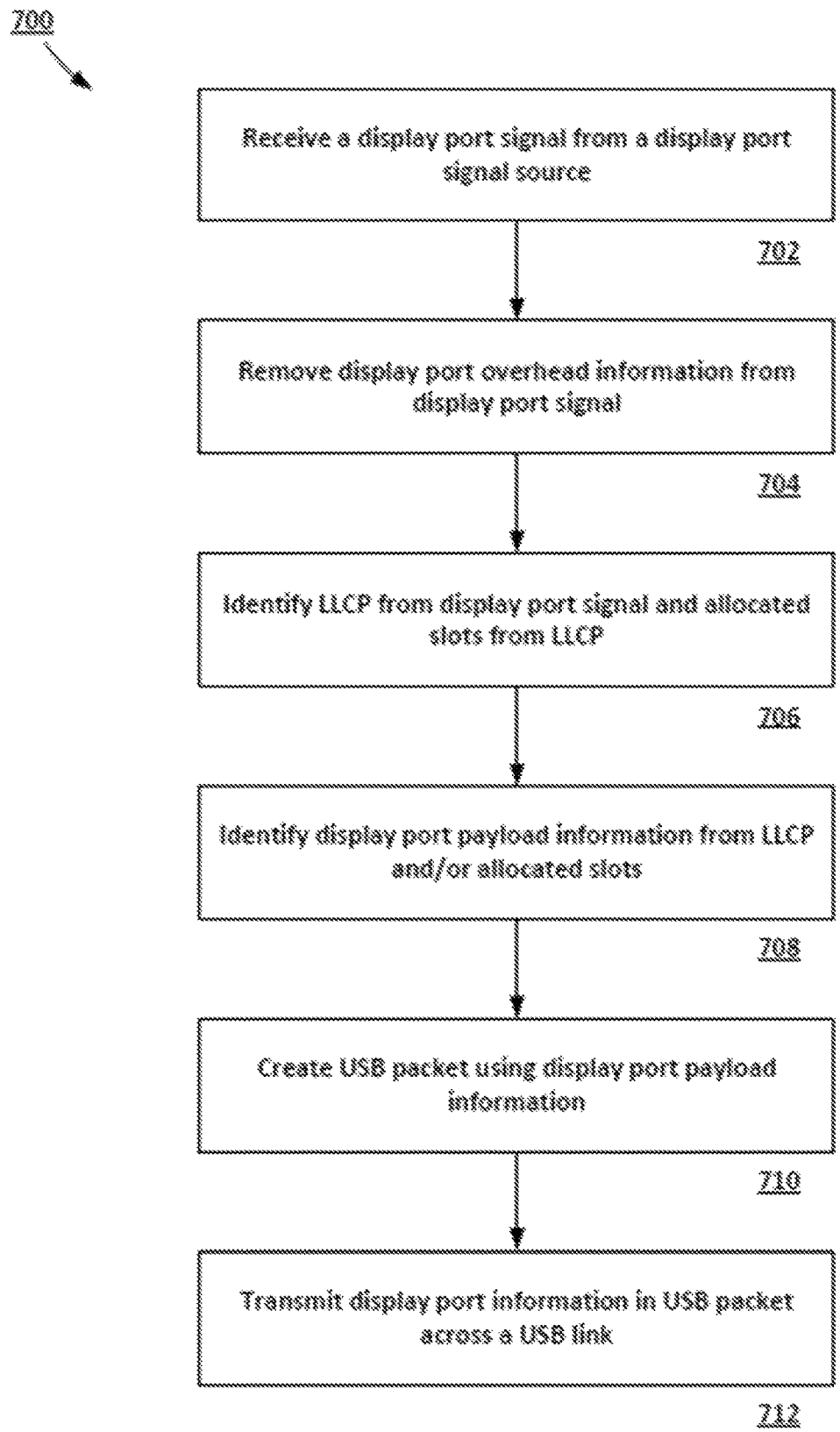
FIG. 7 is a process flow diagram for mapping a display port signal onto a universal serial bus packet in accordance with embodiments of the present disclosure.

FIG. 7 is a process flow diagram 700 for mapping a display port signal onto a USB packet in accordance with embodiments of the present disclosure. A display port signal can be received from a display port source by a USB hub display port input module (702). A display port remover module, implemented in hardware circuitry, software, or a combination of hardware circuitry and software, can remove overhead information from the display port signal (704). Overhead information can include, but is not limited to, padding, idles, and overhead for data scramble, stream synchronizing, and error correction. Display port encoding information can also be removed. The LLCP from the display port signal can be identified, and allocated slots can be identified from the LLCP (706). The display port payload information can be identified from the LLCP and/or the allocated slots of the display port signal (708). A USB-compliant packet can be created from the LLCP and/or the control and/or data payload from the allocated slots (e.g., active link symbols) of the display port signal (710). The USB-compliant packet that includes the display port payload can be transmitted across a USB link (712).

Figure 8:
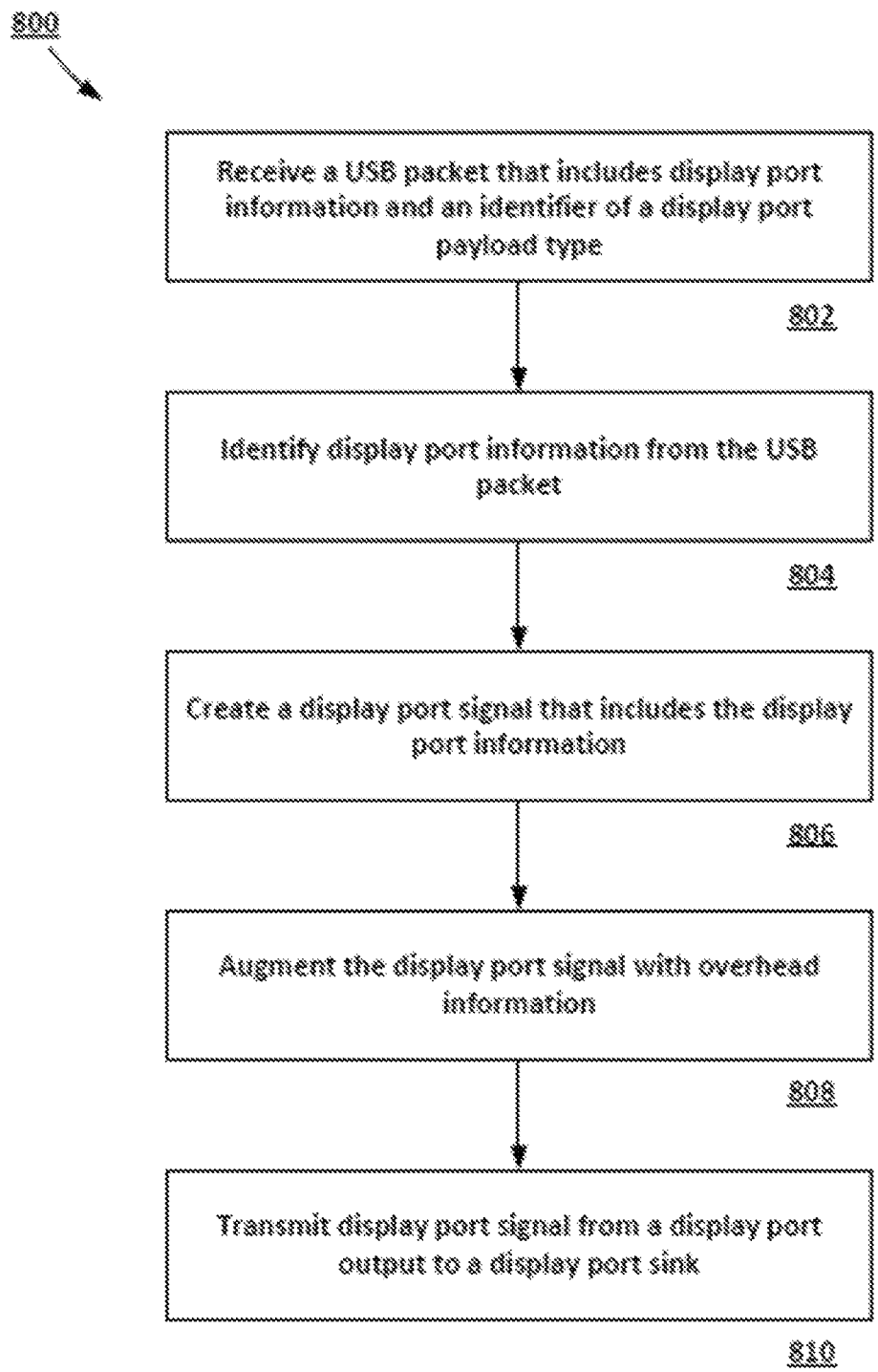
FIG. 8 is a process flow diagram for mapping display port information from a universal serial bus packet into a display port signal in accordance with embodiments of the present disclosure.

FIG. 8 is a process flow diagram 800 for mapping display port information from a USB packet into a display port signal in accordance with embodiments of the present disclosure. A USB-compliant packet that includes display port information can be received at a display port output module from across a USB link (802). The type of display port payload included within the USB-compliant packet can be identified, e.g., using a payload type identifier within a protocol defined field of the USB-compliant packet header (804). A display port signal can be created using the display port payload carried by the USB-compliant packet (806). The display port signal can be a LLCP, a data+control signal, or a data-only signal. The display port signal can be augmented with overhead information, such as padding for unallocated symbols, error correcting code, etc. (808). The display port signal can be transmitted to a display port sink across a display port link (810).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Various aspects and combinations of the embodiments are described above, some of which are represented by the following examples:

Example 1 is an apparatus that includes input circuitry to receive a display port signal, the input circuitry (e.g., DP_IN adapter circuitry in a USB router) can include display port link layer parser circuitry to identify display port control or data information from the received display port signal; and universal serial bus (USB) packet construction circuitry to construct a USB-compliant packet comprising the display port control or data information identified by the display port link layer parser circuitry.

Example 2 may include the subject matter of example 1, wherein the apparatus comprises a router that is based on a USB protocol.

Example 3 may include the subject matter of example 2, wherein the USB protocol comprises a USB 4 protocol. The display port protocol comprises a DP 2.0 protocol.

Example 4 may include the subject matter of any of examples 1-3, and can also include display port information remover circuitry to remove display port encoding information from the received display port signal.

Example 5 may include the subject matter of any of examples 1-4, and can also include display port information remover circuitry to remove display port overhead information from the received display port signal.

Example 6 may include the subject matter of example 5, wherein the display port overhead information comprises data scramble, stream synchronization, or error correction information.

Example 7 may include the subject matter of example 5, wherein the display port overhead information comprises padding bits or idle bits.

Example 8 may include the subject matter of any of examples 1-7, the display port link layer parser circuitry to identify allocated slots containing the display port control or data information from the received display port signal.

Example 9 may include the subject matter of example 8, the USB packet construction circuitry to encode the control or data information from the identified allocated slots in the received the display port signal into corresponding control or data fields in the USB-compliant packet.

Example 10 may include the subject matter of any of examples 1-9, the display port link layer parser circuitry to identify a display port signal type based on information in the received display port signal.

Example 11 may include the subject matter of example 10, the USB packet construction circuitry to encode the display port signal type into a protocol defined field (PDF) header of the USB-compliant packet, the display port signal type encoded into the PDF header comprising an indication of a type of display port packet received with the received display port signal.

Example 12 may include the subject matter of any of examples 1-11, the received display port signal comprising a link layer control packet (LLCP), the display port link layer parser circuitry to identify from the LLCP allocation change trigger (ACT) information, the ACT information identifying allocation of slots of the received display port signal.

Example 13 may include the subject matter of example 12, the USB packet construction circuitry to encode information from the LLCP into a header of the USB-compliant packet.

Example 14 may include the subject matter of any of examples 1-13, the received display port signal comprising control and data information, the USB packet construction circuitry to encode the control information into a corresponding control slot of the USB-compliant packet; and encode the data information into a corresponding data slot of the USB-compliant packet.

Example 15 may include the subject matter of example 14, the USB packet construction circuitry to encode a transfer unit header of the USB-compliant packet with a bit coding describing the control and data information in the received display port signal.

Example 16 may include the subject matter of any of examples 1-15, further comprising a USB-compliant output port to output the USB-compliant packet comprising the display port control or data information across a USB link.

Example 17 is a method that includes receiving, at a display port input of a universal serial bus (USB) routing device, a display port signal; removing, by deconstruction logic implemented in hardware, display port overhead information form the display port signal; identifying, by display port parsing logic implemented in hardware, display port payload information from the display port signal; constructing, by a USB packetizer logic implemented in hardware, a USB-compliant packet that includes the display port payload information; and transmitting the USB-compliant packet that includes the display port payload information across a USB link.

Example 18 may include the subject matter of example 17, wherein the display port overhead information comprises data scramble, stream synchronization, error correction information, or idle bits.

Example 19 may include the subject matter of any of examples 17-18, further comprising, removing, by the deconstruction logic, display port encoding information from the display port signal.

Example 20 may include the subject matter of any of examples 17-19, further comprising identifying, by the display port parsing logic, allocated slots containing the display port payload information from the display port signal.

Example 21 may include the subject matter of example 20, further comprising encoding, by the USB packetizer logic, the display port payload information from the identified allocated slots in the received the display port signal into corresponding payload fields in the USB-compliant packet.

Example 22 may include the subject matter of example 20, wherein displaying the display port payload information comprising identifying the display port payload information from active link symbols from the display port signal.

Example 23 may include the subject matter of any of examples 17-22, further comprising identifying a link layer control packet (LLCP) from the display port signal, the LLCP comprising control information for the display port signal; identifying allocated slots from the LLCP; and encoding a USB-compliant packet with the control information from the allocated slots.

Example 24 is a system that includes a universal serial bus (USB) router device comprising a display port input device to receive a display port signal. The display port input device can include display port link layer parser circuitry to identify display port control or data information from the received display port signal, universal serial bus (USB) packet construction circuitry to construct a USB-compliant packet comprising the display port control or data information identified by the display port link layer parser circuitry, and a USB switch to transmit the USB-compliant packet comprising the display control or data information over a USB-compliant link. The system can also include a display port output device. The display port output device can include a USB switch to receive the USB-compliant packet comprising the display control or data information over a USB-compliant link, display port packetizer circuitry to construct a display port packet from the display port control or data information from the USB-compliant packet, and display port output circuitry to output the display port packet across a display port link.

Example 25 may include the subject matter of example 24, the display port input device comprising display port information remover circuitry to remove display port encoding information from the received display port signal, and remove display port overhead information from the received display port signal, the display port overhead information comprises data scramble, stream synchronization, or error correction information.

Example 26 may include the subject matter of any of examples 24-25, wherein the display port link layer parser circuitry to identify allocated slots containing the display port control or data information from the received display port signal; and the USB packet construction circuitry to encode the control or data information from the identified allocated slots in the received the display port signal into corresponding control or data fields in the USB-compliant packet.

Example 27 may include the subject matter of any of examples 24-26, wherein the display port link layer parser circuitry to identify a display port signal type based on information in the received display port signal; and the USB packet construction circuitry to encode the display port signal type into a protocol defined field (PDF) header of the USB-compliant packet, the display port signal type encoded into the PDF header comprising an indication of a type of display port packet received with the received display port signal.

Example 28 may include the subject matter of example 27, wherein the display port construction circuitry is to identify a display port signal type from the PDF header of the USB-compliant packet; and construct the display port packet based on the display port signal type.

Example 29 may include the subject matter of any of examples 24-28, wherein the input device comprises a display port input adapter and the output device comprises a display port output adapter.

Example 30 is an apparatus that includes a display port input (DP_IN) adapter to receive a DP input signal from a DP source. The DP_IN adapter can include a means for removing overhead information from the DP signal, a means for parsing the DP signal to identify allocated slots in the DP signal and identify payload information from the DP signal. The DP_IN adapter can include a means for constructing a USB4-compliant packet from the DP signal and the payload information from the DP signal.

Example 31 is an apparatus that includes a display port output (DP_OUT) adapter to receive a USB4-compliant packet from a USB4-compliant switch. The DP_OUT adapter can include a means for extracting DP payload from the USB4-compliant packet, a means for building a DP frame by adding the DP payload into allocated slots of the DP frame, and a means for reconstructing the DP signal overhead information.

What is claimed is:

1. An apparatus comprising:
 display port input circuitry to receive a display port signal, the display port circuitry comprising:
  display port link layer parser circuitry to:
   identify display port control or data information from the received display port signal; and
   identify allocated slots containing the display port control or data information from the received display port signal; and
  universal serial bus (USB) packet construction circuitry to construct a USB-compliant packet comprising the display port control or data information identified by the display port link layer parser circuitry.

2. The apparatus of claim 1, wherein the apparatus comprises a router that is based on a USB protocol.

3. The apparatus of claim 2, wherein the USB protocol comprises a USB 4 protocol.

4. The apparatus of claim 1, further comprising display port information remover circuitry to remove display port encoding information from the received display port signal.

5. The apparatus of claim 4, wherein the display port information remover circuitry is to remove display port overhead information from the received display port signal.

6. The apparatus of claim 5, wherein the display port overhead information comprises data scramble, stream synchronization, or error correction information.

7. The apparatus of claim 5, wherein the display port overhead information comprises padding bits or idle bits.

8. The apparatus of claim 1, the USB packet construction circuitry to encode the control or data information from the identified allocated slots in the received display port signal into corresponding control or data fields in the USB-compliant packet.

9. The apparatus of claim 1, the display port link layer parser circuitry to identify a display port signal type based on information in the received display port signal.

10. The apparatus of claim 9, the USB packet construction circuitry to encode the display port signal type into a protocol defined field (PDF) header of the USB-compliant packet, the display port signal type encoded into the PDF header comprising an indication of a type of display port packet received with the received display port signal.

11. The apparatus of claim 1, the received display port signal comprising a link layer control packet (LLCP), the display port link layer parser circuitry to identify from the LLCP allocation change trigger (ACT) information, the ACT information identifying allocation of slots of the received display port signal.

12. The apparatus of claim 11, the USB packet construction circuitry to encode information from the LLCP into a header of the USB-compliant packet.

13. The apparatus of claim 1, the received display port signal comprising control and data information, the USB packet construction circuitry to:
 encode the control information into a corresponding control slot of the USB-compliant packet; and
 encode the data information into a corresponding data slot of the USB-compliant packet.

14. The apparatus of claim 13, the USB packet construction circuitry to encode a transfer unit header of the USB-compliant packet with a bit coding describing the control and data information in the received display port signal.

15. The apparatus of claim 1, further comprising a USB-compliant output port to output the USB-compliant packet comprising the display port control or data information across a USB link.

16. A method comprising:
 receiving, at a display port input of a universal serial bus (USB) routing device, a display port signal;
 removing, by deconstruction logic implemented in hardware, display port overhead information from the display port signal;
 identifying, by display port parsing logic implemented in hardware, display port payload information from the display port signal;
 constructing, by a USB packetizer logic implemented in hardware, a USB-compliant packet that includes the display port payload information; and
 transmitting the USB-compliant packet that includes the display port payload information across a USB link.

17. The method of claim 16, wherein the display port overhead information comprises data scramble, stream synchronization, error correction information, or idle bits.

18. The method of claim 16, further comprising, removing, by the deconstruction logic, display port encoding information from the display port signal.

19. The method of claim 16, further comprising identifying, by the display port parsing logic, allocated slots containing the display port payload information from the display port signal.

20. The method of claim 19, further comprising encoding, by the USB packetizer logic, the display port payload information from the identified allocated slots in the received display port signal into corresponding payload fields in the USB-compliant packet.

21. The method of claim 19, wherein displaying the display port payload information comprising identifying the display port payload information from active link symbols from the display port signal.

22. The method of claim 16, further comprising:
 identifying a link layer control packet (LLCP) from the display port signal, the LLCP comprising control information for the display port signal;
 identifying allocated slots from the LLCP; and
 encoding a USB-compliant packet with the control information from the allocated slots.

23. A system comprising:
 a universal serial bus (USB) router device comprising:
  a display port input device to receive a display port signal, the display port input device comprising:

display port link layer parser circuitry to identify display port control or data information from the received display port signal, universal serial bus (USB) packet construction circuitry to construct a USB-compliant packet comprising the display port control or data information identified by the display port link layer parser circuitry, and a USB switch to transmit the USB-compliant packet comprising the display control or data information over a USB-compliant link; and a display port output device comprising:

a USB switch to receive the USB-compliant packet comprising the display control or data information over a USB-compliant link, display port packetizer circuitry to construct a display port packet from the display port control or data information from the USB-compliant packet, and display port output circuitry to output the display port packet across a display port link.

24. The system of claim 23, the display port input device comprising display port information remover circuitry to:

remove display port encoding information from the received display port signal; and remove display port overhead information from the received display port signal, the display port overhead information comprises data scramble, stream synchronization, or error correction information.

25. The system of claim 23, wherein:

the display port link layer parser circuitry to identify allocated slots containing the display port control or data information from the received display port signal; and the USB packet construction circuitry to encode the control or data information from the identified allocated slots in the received display port signal into corresponding control or data fields in the USB-compliant packet.

26. The system of claim 23, wherein:

the display port link layer parser circuitry to identify a display port signal type based on information in the received display port signal; and the USB packet construction circuitry to encode the display port signal type into a protocol defined field (PDF) header of the USB-compliant packet, the display port signal type encoded into the PDF header comprising an indication of a type of display port packet received with the received display port signal.

27. The system of claim 26, wherein the display port construction circuitry is to:

identify a display port signal type from the PDF header of the USB-compliant packet; and construct the display port packet based on the display port signal type.

* * * * *